US007695748B2

(12) United States Patent
Hruschka et al.

(10) Patent No.: US 7,695,748 B2
(45) Date of Patent: Apr. 13, 2010

(54) METHOD FOR REDUCING CHOLESTEROL IN OILS OR FATS

(75) Inventors: Steffen Hruschka, Oelde (DE); Klemens Geissen, Oelde (DE); Wladislawa Boszulak, Oelde (DE)

(73) Assignee: Westfalia Separator AG, Oelde (DE)

( * ) Notice: Subject to any disclaimer, the term of this patent is extended or adjusted under 35 U.S.C. 154(b) by 1221 days.

(21) Appl. No.: 11/185,873

(22) Filed: Jul. 21, 2005

(65) Prior Publication Data

US 2006/0019008 A1 Jan. 26, 2006

(30) Foreign Application Priority Data

Jul. 21, 2004 (DE) ....................... 10 2004 035 217
Jul. 30, 2004 (DE) ....................... 10 2004 037 106

(51) Int. Cl.
*A23D 9/02* (2006.01)

(52) U.S. Cl. ....................................... 426/417; 426/478

(58) Field of Classification Search .................. 426/417
See application file for complete search history.

(56) References Cited

U.S. PATENT DOCUMENTS 1,413,579 A * 4/1922 Gill ............................. 99/347
3,613,555 A * 10/1971 Ogman ........................ 99/446
3,804,965 A * 4/1974 Peters ........................ 426/523
4,704,294 A * 11/1987 Rakosky ...................... 426/578
4,880,573 A * 11/1989 Courregelongue et al. .. 426/417
4,980,185 A * 12/1990 Small ......................... 426/417
5,091,203 A * 2/1992 Conte et al. ................. 426/614
5,116,633 A * 5/1992 Small ......................... 426/641
5,128,162 A * 7/1992 Wrezel et al. ............... 426/417
5,232,725 A * 8/1993 Roderbourg et al. ........ 426/417
5,316,780 A * 5/1994 Stouffer et al. .............. 426/424
5,370,890 A * 12/1994 Sundfeld et al. ............ 426/417
5,824,354 A * 10/1998 Ritter et al. ................. 426/417
5,880,300 A * 3/1999 Kodali ........................ 554/190
6,129,945 A * 10/2000 Awad et al. ................. 426/580

FOREIGN PATENT DOCUMENTS

EP 0 256 911 A1 2/1988
EP 0 350 379 A1 1/1990
WO WO 98/33875 A1 8/1998

OTHER PUBLICATIONS

Stecher, Paul, editor. 1968. The Merck Index, 8th edition. Merck & Co., Inc. Rahway, New Jersey. p. 253.*

* cited by examiner

*Primary Examiner*—Carolyn A Paden
(74) *Attorney, Agent, or Firm*—Barnes & Thornburg LLP

(57) ABSTRACT

A process of reducing the cholesterol content in cholesterol-containing organic oils or fats, particularly animal oils or fats. The process comprises the steps of: adding at least one of demineralized water and distilled water having a set pH-value to the oil cholesterol containing oils or fats, thereby forming a mixture; and separating the mixture into a cholesterol-containing aqueous phase and a cholesterol-reduced oil or fat phase.

13 Claims, 3 Drawing Sheets

METHOD FOR REDUCING CHOLESTEROL IN OILS OR FATS

CROSS-REFERENCE

This Application claims benefit of German Application No. 10 2004 035 217.8 filed on Jul. 21, 2004 and German Application No. 10 2004 037 106.7 filed on Jul. 30, 2004 both disclosures of which are hereby incorporated by reference herein.

BACKGROUND AND SUMMARY

The present disclosure relates to a process of reducing the cholesterol content in cholesterol-containing organic oils or fats, particularly animal oils or fats.

In order to be able to subject organic oils or fats, particularly animal oils or fats, preferably beef drippings, to a processing of the highest possible quality, it is desirable to reduce the cholesterol content in these oils or fats in a simple manner.

A process of reducing the cholesterol content in cholesterol-containing organic oils or fats is addressed in the present disclosure, the process comprising the following steps: adding at least one of demineralized water and distilled water having a set pH-value to the cholesterol-containing oils or fats, thereby forming a mixture; and separating the mixture into a cholesterol-containing aqueous phase and a cholesterol-reduced oil or fat phase.

The process-related and time-related expenditures for reducing the cholesterol content are extremely low in this simple process. A receptacle for mixing the oil or fat with the water and a separating device connected behind the latter are sufficient. Tests have shown that clear reductions of the cholesterol content in oil or fat can be achieved by this process. According to the present disclosure, beef drippings may represent a product suitable for treatment by the process. The separation of the cholesterol-containing aqueous phase takes place fast and effectively by a separating centrifuge, particularly a separator with a vertical axis of rotation with a disk stack.

The demineralized and/or distilled water added in the process may have a fixedly set pH-value either in an acidic or an alkaline range.

Good results with respect to reducing the percentage of the cholesterol content can be achieved when the demineralized and/or distilled water added in the process has a pH-value of between 4 and 6, and possibly between 5 and 6. The demineralized and/or distilled water added may have a pH-value between 6.5 and 8.

The separating step takes place immediately after the addition of the water. In this case, “immediately” may mean a time period of maximally 5-10 minutes but may be up to 120 seconds or up to 60 seconds. The use of a buffer tank before the separation of the aqueous phase is also conceivable, according to the present disclosure.

A still further lowering of the cholesterol content can be achieved when the steps of adding the water and separating the aqueous phase are repeated once or several times.

Other aspects of the present disclosure will become apparent from the following descriptions when considered in conjunction with the accompanying drawings.

DETAILED DESCRIPTION

Figure 1:
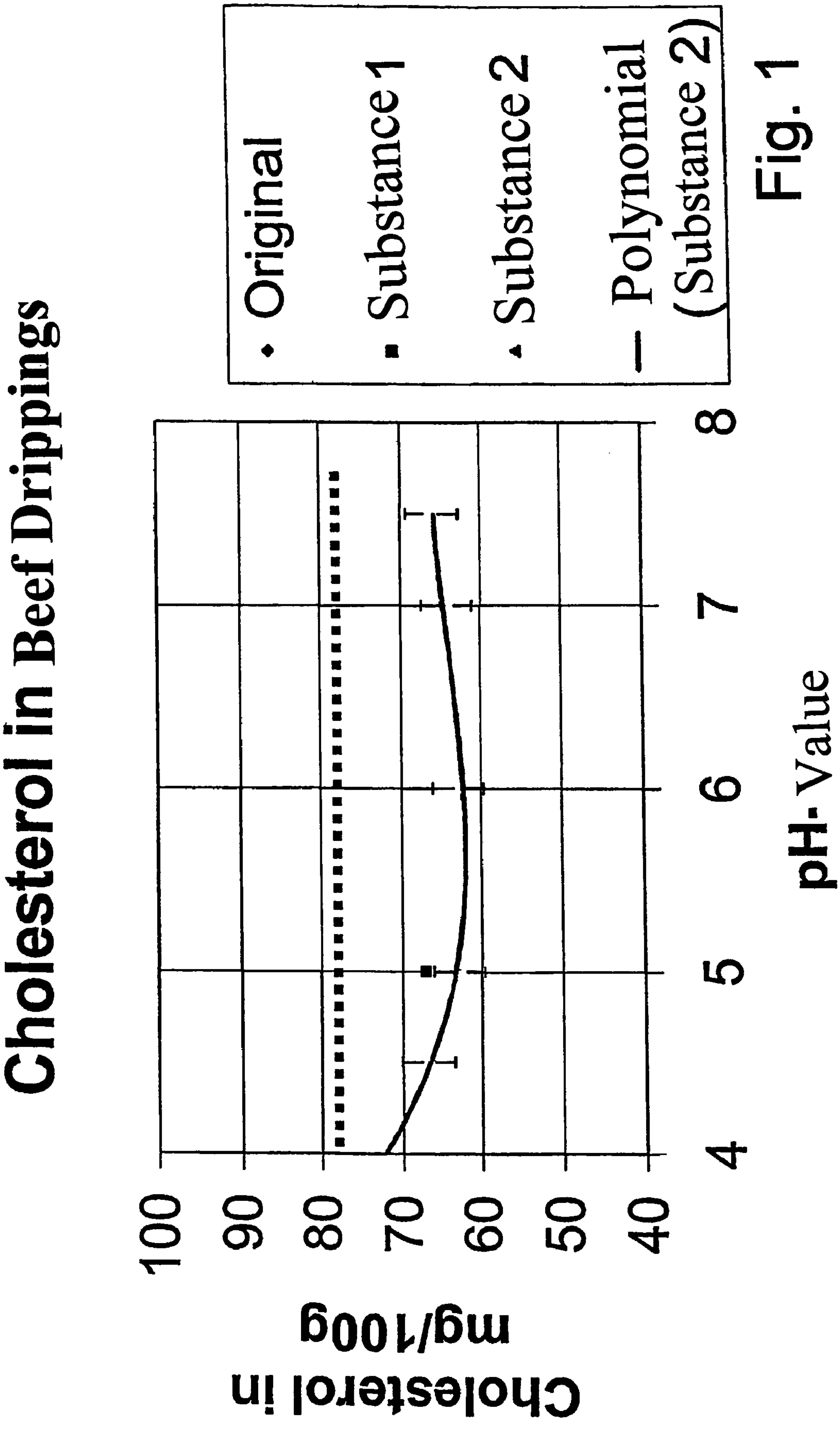
FIG. 1 shows a diagram which reflects the results of several tests carried out according to the process of the present disclosure.

Referring to FIG. 1, distilled water was added in each case to specimens of 2 kg cut-up beef drippings at a ratio of 1:1 with different pH-values of 4.5; 5; 7; and 7.5.

The mixtures of beef drippings and water were then in each case, immediately after the addition of water, separated in a cup-type centrifuge in each case into an aqueous cholesterol-containing phase and a cholesterol-reduced oil or fat phase. This resulted in the reductions, as shown in FIG. 1, of the cholesterol content of the beef dripping of up to 40% with an optimum in the above-indicated acidic range of the fixed pH-value setting of the added water.

A pH-value adjustment in the ranges of the pH-value correction of the added water in each case leads to a reduction of the cholesterol value.

Citric acid or sodium hydroxide solution was used for the pH-value adjustment. The water was metered cold (50 EC) to the drippings. The extraction time amounted to 5 minutes.

Figure 2:
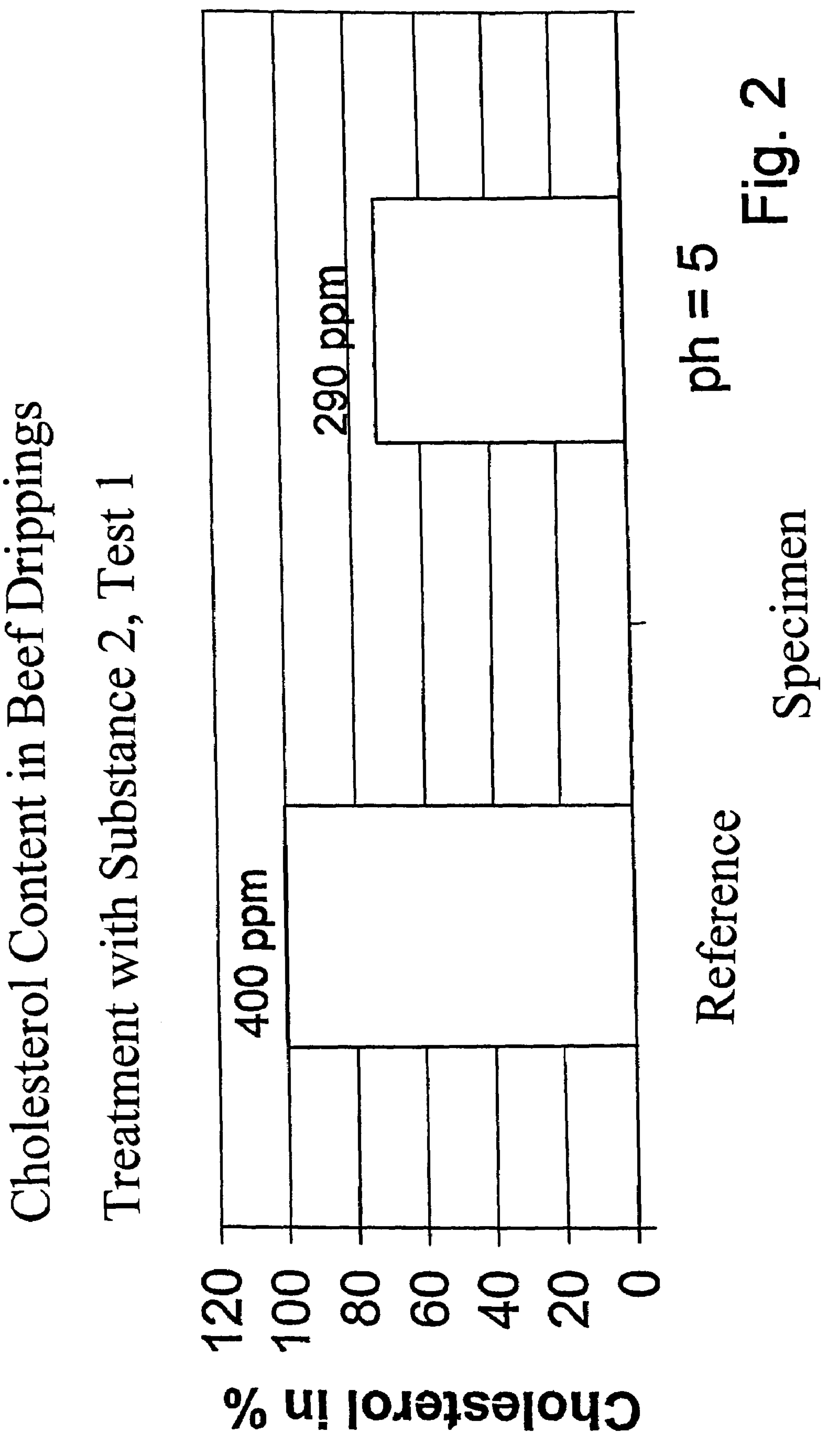
FIG. 2 shows a diagram which reflects the results of two individual tests according to the process of the present disclosure.

According to the test shown in FIG. 2, 2 liters of water with a pH-value of 5 were added to a specimen of 2 kg beef drippings.

This 1:1 mixture of beef drippings and water was then in each case, immediately after the addition of the water, separated in a cup-type centrifuge at 6,000 g (gravitational acceleration) into an aqueous cholesterol-containing phase and a cholesterol-reduced oil or fat phase. This resulted in the reduction of the cholesterol content from 400 ppm to 290 ppm which is shown in FIG. 2.

For industrial applications, separating centrifuges are suitable, such as separators, and possibly disk separators, preferably at more than 5,000 g, which may reach up to 10,000-15,000 g in the process.

Figure 3:
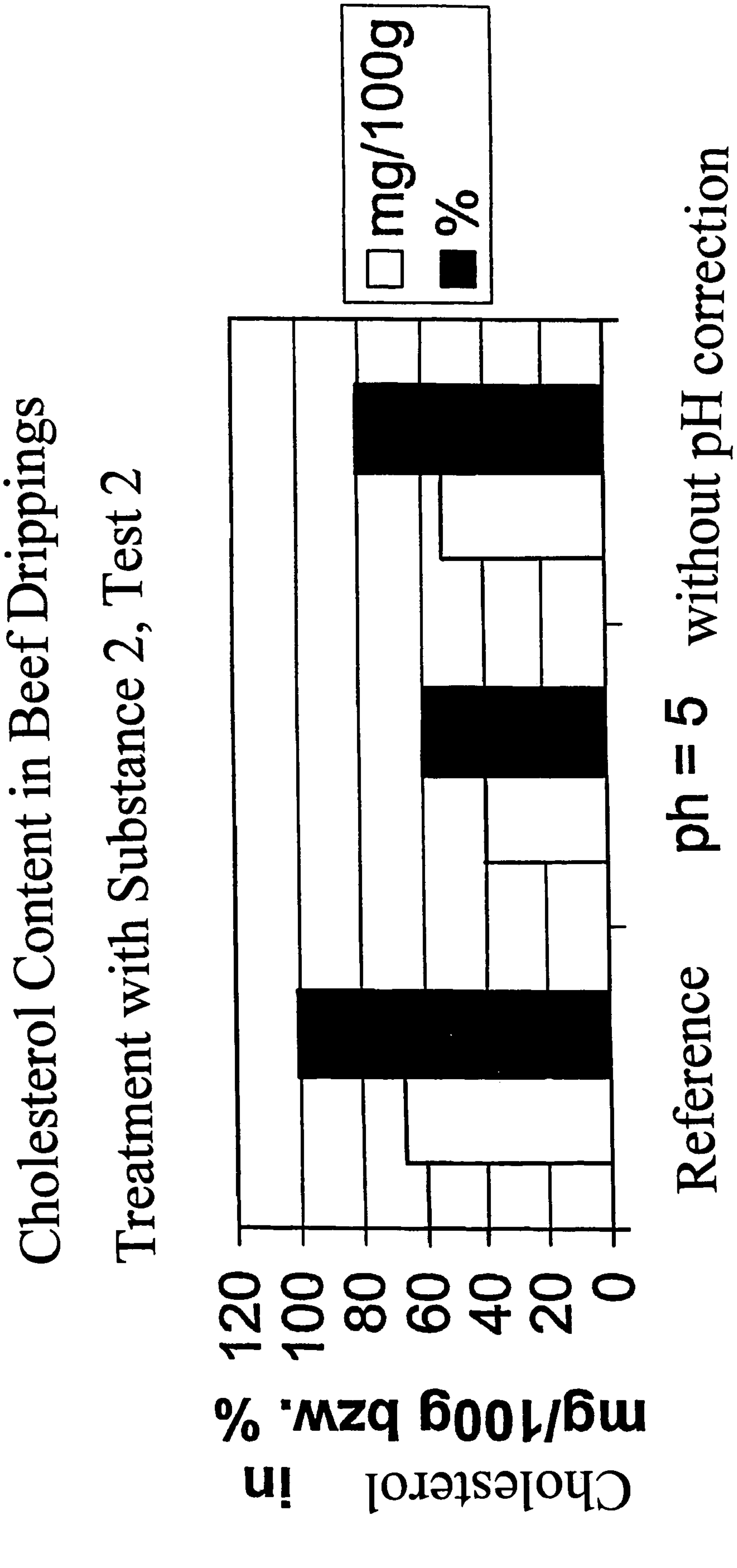
FIG. 3 shows a diagram which reflects the results of a test with a specimen at a mixing ratio of 1:1, according to the present disclosure.

FIG. 3 shows the results of a further test with another specimen at a mixing ratio of 1:1. A reduction from 660 ppm to 400 ppm was achieved with an addition of distilled water of a pH-value of 5, and from 660 ppm to 540 ppm with an addition of distilled water without a pH-value adjustment.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A process of reducing the cholesterol content in cholesterol-containing beef drippings, the process comprising the steps of:

adding only at least one of demineralized water and distilled water having a set pH-value between 4 and 8 to the cholesterol-containing beef drippings, thereby forming a mixture; and separating the mixture into a cholesterol-containing aqueous phase and a cholesterol-reduced oil or fat phase within a time period of less than 10 minutes.

2. The process according to claim 1, wherein the separating into the cholesterol-containing aqueous phase takes place in a centrifuge.

3. The process according to claim 1, wherein the separating into the cholesterol-containing aqueous phase takes place in a separating centrifuge.

4. The process according to claim 1, wherein the separating takes place within a time period of less than 5 minutes after the adding of the at least one of demineralized water and distilled water.

5. The process according to claim 1, wherein the steps of adding and separating are repeated at least once.

6. The process according to claim 1, wherein the at least only one of demineralized water and distilled water is added to the cholesterol-containing oils or fats at a ratio of 1:1.

7. The process according to claim 1, wherein the separating into the cholesterol-containing aqueous phase takes place in a separator.

8. The process according to claim 7, wherein the separator includes a vertical axis of rotation and a disk stack.

9. The process according to claim 1, wherein the separating takes place within a period of less than 120 seconds after the adding of only the at least one of demineralized water and distilled water.

10. The process according to claim 1, wherein the separating takes place within a time period of less than 60 seconds after the adding of only the at least one of demineralized water and distilled water.

11. A process of reducing the cholesterol content in cholesterol-containing beef drippings, the process comprising the steps of:

adding only at least one of demineralized water and distilled water having a set pH-value between 4 and 6 to the cholesterol-containing beef drippings, thereby forming a mixture; and separating the mixture into a cholesterol-containing aqueous phase and a cholesterol-reduced oil or fat phase.

12. The process according to claim 11, wherein the separating takes place within a period of less than 120 seconds after the adding of only the at least one of demineralized water and distilled water.

13. The process according to claim 11, wherein the separating takes place within a time period of less than 60 seconds after the adding of only the at least one of demineralized water and distilled water.

* * * * *